United States Patent [19]

Wilbur, Jr. et al.

[11] Patent Number: 4,500,767
[45] Date of Patent: Feb. 19, 1985

[54] SHADOW MASK WASHER/SPRING WELDING APPARATUS

[75] Inventors: Leonard P. Wilbur, Jr., Lancaster; Marinus Van Renssen, Leola, both of Pa.

[73] Assignee: RCA Corporation, New York, N.Y.

[21] Appl. No.: 517,840

[22] Filed: Jul. 27, 1983

[51] Int. Cl.³ .............................................. B23K 11/10
[52] U.S. Cl. ........................ 219/78.01; 219/86.24; 219/86.33; 219/86.1
[58] Field of Search ............... 219/78.01, 86.1, 86.24, 219/86.25, 86.7, 86.41, 86.33; 313/402, 404, 407; 901/42

[56] References Cited

U.S. PATENT DOCUMENTS

| | | | |
|---|---|---|---|
| 2,882,386 | 4/1959 | Hermanny | 219/90 |
| 2,889,446 | 6/1959 | Gartner et al. | 219/86 |
| 3,003,051 | 10/1961 | Kulicke, Jr. et al. | 219/78 |
| 3,334,259 | 8/1967 | Shrader | 313/85 |
| 3,803,436 | 4/1974 | Morrell | 313/85 |

FOREIGN PATENT DOCUMENTS

| | | | |
|---|---|---|---|
| 2700602 | 7/1978 | Fed. Rep. of Germany | 901/42 |
| 7036498 | 9/1977 | Japan | 219/86.1 |

Primary Examiner—Roy N. Envall, Jr.
Assistant Examiner—C. M. Sigda
Attorney, Agent, or Firm—Eugene M. Whitacre; Lester L. Hallacher; Thomas H. Magee

[57] ABSTRACT

A welding apparatus for welding a washer to a frame retaining spring while the washer and the spring are in engagement with a stud affixed to the sidewall of a kinescope panel. A welding head is suspended by an articulated joint and by flexible straps whereby the welding head is free to pivot and to flex to assure engagement with the parts to be welded when the spring is out of alignment with the welding head.

18 Claims, 8 Drawing Figures

SHADOW MASK WASHER/SPRING WELDING APPARATUS

BACKGROUND

This invention relates generally to the welding of thin metal parts and particularly to a welding apparatus for welding a washer to the support spring of a shadow mask assembly for color kinescopes.

A color television tube contains an apertured color selection electrode, commonly called a shadow mask, which causes the three electron beams to strike the phosphors which emit the proper colors of light. As shown in FIGS. 1-3, a shadow mask 11 is permanently attached to a frame 12. The frame 12 provides rigidity for the shadow mask 11 and serves as a mechanism for supporting the shadow mask in a faceplate panel 13. A phosphor screen 14 is provided on the inside surface of the panel 13 so that the panel serves as the viewing screen of the tube. The shadow mask 11 is supported a specified distance, commonly called the q spacing, from the screen 14. Metallic conically shaped studs 16, 17, 18 and 19 are embedded in the four sidewalls 15 of the panel 13 (FIG. 1). Resilient leaf springs 21, 22, 23 and 24 are welded to the shadow mask frame 12. The springs 21-24 each contain an aperture 26 (FIG. 3) which engages the studs 16-19 to retain the shadow mask 11 in the panel 13 at the required q spacing.

The proper engagement of the studs and spring apertures necessitates the accurate location of the studs 16-19 in the sidewalls of the panel and the accurate location of the springs on the frame 12. It is difficult to accurately locate all four of the studs in the panel 13 because the glass is molten when the studs are inserted and changes in the glass during cooling are inconsistent and unpredictable. Accordingly, it has become standard practice to provide one of the leaf springs with an oversized aperture so that the aperture is larger than the stud and does not engage the stud. The other three springs include apertures which are dimensioned to firmly engage the studs. A washer 27 (FIG. 1) is placed on the stud 18 to rest against the spring 23 which has the oversized aperture. The aperture in the washer 27 is dimensioned to snugly engage the stud 18 and the washer diameter is sufficiently large to completely cover the oversized aperture. The frame 12 is placed in the panel 13 with the other three springs snugly engaging studs irrespective of whether or not the stud 18 is off-center from the oversized aperture in the spring 23. The washer is then welded to the spring to accurately locate the fourth spring aperture with the fourth stud. Such a method is disclosed in U.S. Pat. No. 3,334,259.

Difficulty has arisen in this technique because the limited space between the frame 12 and the sidewall 15 of the panel 13 makes it very difficult to weld the washer 27 onto the spring 23. Accordingly, typically, the washer 27 is lightly welded to the spring 23. The shadow mask is removed from the panel 13 and the washer is permanently welded to the spring. Problems arise because the initial light weld frequently breaks and the washer 27 separates from the spring 23. The shadow mask must be put back into the panel and initial welding repeated. There, therefore, is a need for a welding apparatus which permits the permanent and strong welding of the washer 27 to the spring 23 while the frame 12 is positioned in the faceplate 13. The instant invention fulfills this need.

SUMMARY

A welding apparatus for welding a washer to a frame retaining spring while the washer and spring are in engagement with a stud affixed to the sidewall of a kinescope panel is provided. The spring includes an aperture for loosely receiving the stud and the washer includes an aperture for snugly receiving the stud. The welding apparatus includes a moveable carrier for receiving the panel and for moving the panel to a preselected weld location. Frame support means is positioned in the vicinity of the frame, the frame is sensed and the frame support means is moved into contact with the frame to support the frame at the predetermined location. A welding head includes at least one welding electrode and at least one ground electrode and is moved to the preselected weld location whereby the washer and the spring are positioned between the welding electrode and the ground electrode. The electrodes are closed against the frame retaining spring and the washer whereby welding current can be passed through the electrodes to weld the washer to the spring.

CROSS REFERENCE TO RELATED APPLICATIONS

The welding circuit described in Application Ser. No. 06/517,847 entitled "Welding System Having Independently Energizing Welding Electrodes" filed on even date herewith by Leonard P. Wilbur, Jr. can be used as the welding circuit in the present invention.

DETAILED DESCRIPTION AND OPERATION

Figure 4:
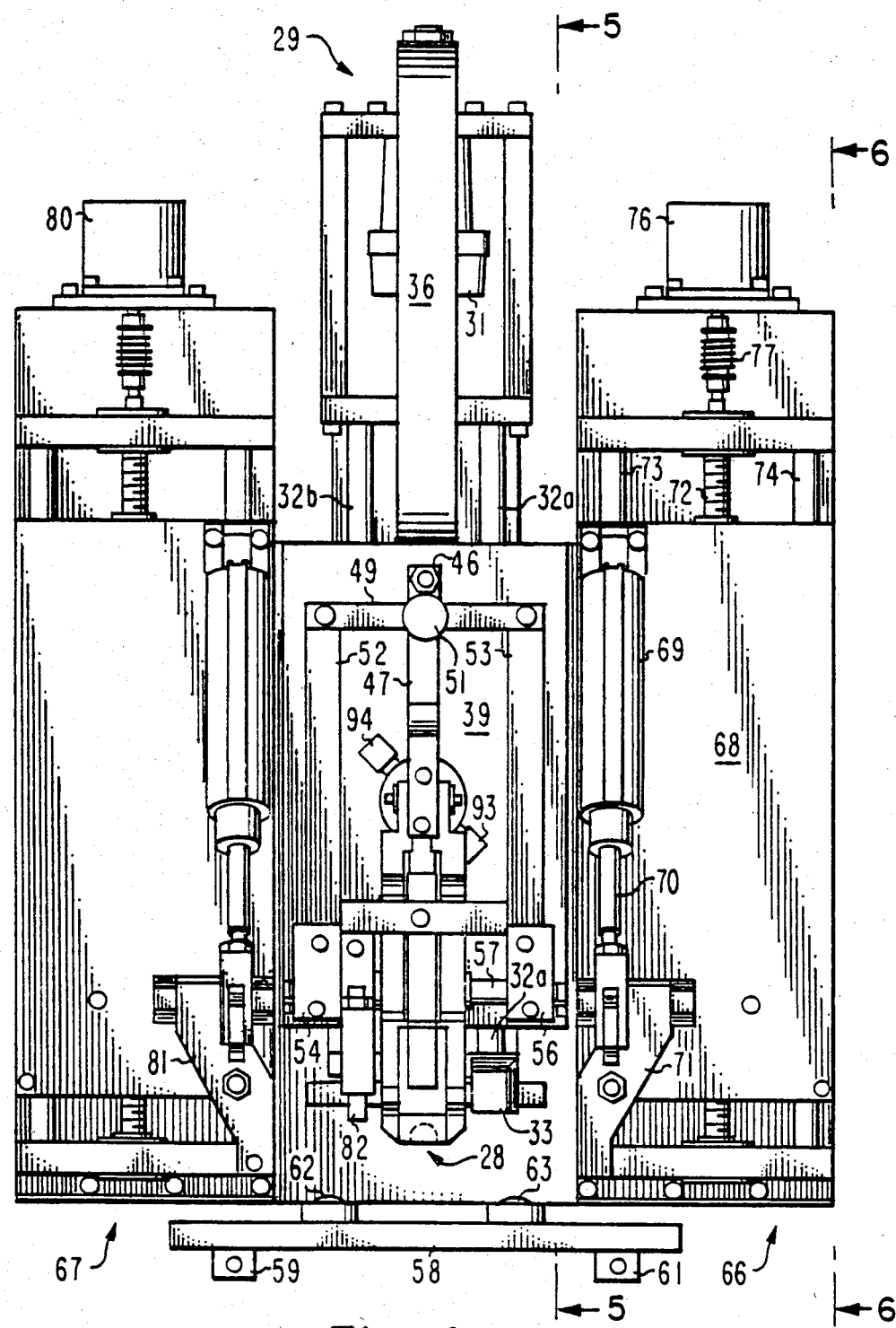
FIG. 4 is a front view of a preferred embodiment of a welding apparatus.
Figure 5:
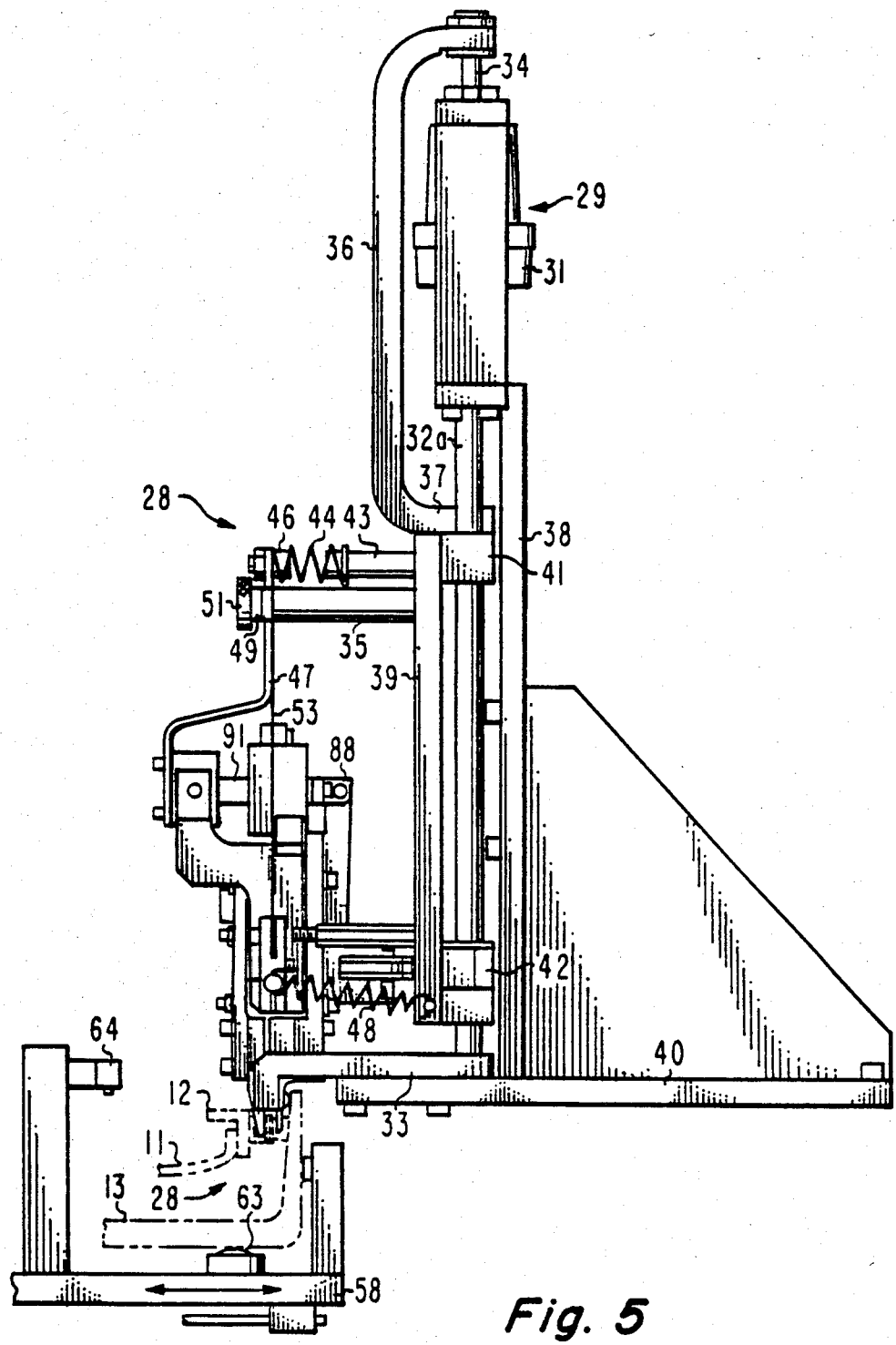
FIG. 5 is a side view of the welding apparatus taken along line 5—5 of FIG. 4.

FIGS. 4 and 5 show a welding apparatus 10 including a welding head 28, which is moveably supported by a vertical support assembly 29. The vertical support assembly 29 includes a cylinder 31 having a shaft 34 which is coupled to the welding head 28 by a U shaped member 36, a support plate 39 and a support pin 35. The cylinder 31 is supported by two fixed shafts 32a and 32b which are fixed to a main frame member 40. One side 37 of the U-shaped member 36 moves vertically between the shafts 32a and 32b. The shafts 32a and 32b are held in a vertical position by a vertical support 38, which is also fixed to the main frame 40. The support plate 39 is slidably coupled to the shafts 32a and 32b by bushing blocks 41 and 42.

The cylinder 31 when actuated, moves the shaft 34 vertically. The welding head 28 is coupled to the shaft 34 through support pin 35, the support plate 39 and the U-shaped member 36 and thus moves along with the shaft 34. The bushing blocks 41 and 42, to which the support plate 39 is attached, slide vertically along the fixed shafts 32a and 32b while the side 37 of the U-shaped member 36 moves between the fixed shafts. The shafts 32a and 32b prevent the support 39 from rotating about the longitudinal axis of the support plate 39.

A pin 43 is horizontally fixed to the support plate 39. One end of a spring 44 engages the pin 43 and the other end of the spring 44 engages another pin 46. One end of a welding head location member 47 is coupled to the pin 46. The location member 47 is suspended from the support plate 39 by the support pin 35. The welding head 28 is suspended from the other end of the location member 47. The details of the welding head 28 are described hereinafter with respect to FIGS. 7 and 8. Another spring 48 biases the welding head 28 toward the vertical support plate 39. The pins 43 and 46 in cooperation with the spring 44 form an articulated joint which permits the welding head 28 to move in the plane of the paper of FIG. 5. Accordingly, the vertical position of the welding head can be adjusted by use of an adjustment knob 51, which is associated with the support pin 35. Additionally, the articulated joint permits the welding head 28 to pivot about the pin 43 in the plane of the paper of FIG. 4. The spring 44 presses against the location member 47 to maintain the vertical position of the welding head 28 and to press the location member 47 against the adjustment screw 51. A rigid support bar 49 is fixed to the support pin 35. Flexible straps 52 and 53 are coupled to the rigid bar 49. Mounting blocks 54 and 56 are fixed to the other ends of the flexible straps 52 and 53, respectively. A shaft 57 is loosely received by the mounting blocks 54 and 56 and the welding head 28 is coupled to the shaft 57. The flexible straps 52 and 53 are flexible in and out of the plane FIG. 4. Accordingly, the welding head 28 can be aligned with shadow mask frames which are not accurately aligned with the welding apparatus.

A moveable carrier 58 is arranged beneath the welding head 28 and includes slides 59 and 61. The carrier 58 includes panel rests 62 and 63. The panel 13 is placed upon the rests 62 and 63 with the carrier 58 displaced outwardly away from the welding head 28. The panel is centered on the support 58 and firmly held in the centered position by centering members (not shown) of a known type. A stepping motor or cylinder is used to move the moveable support 58 inwardly toward the welding head to a known position, which can be established by a mechanical stop or a proximity switch. At least one vibrator 64 (FIG. 5) is provided on the moveable support 58. The vibrator 64 acts against the frame assembly 12 to briefly vibrate the frame to assure that all of the spring apertures firmly engage the studs within the panel. After the moveable support 58 horizontally positions the shadow mask frame 12 and the panel 13 in the vicinity of the welding head 28, the shadow mask frame 12 and the panel 13 are raised and supported at a predetermined location in a manner described with respect to FIGS. 4 and 6. The inside surface of the sidewall of the panel 13 is located against a fixed reference arm 33.

FIG. 4 shows frame support assemblies 66 and 67 which are mirror images of one another. The support assembly 66 includes a mounting plate 68 upon which a cylinder 69 is mounted. A shaft 70 of the cylinder 69 is pivotably coupled to a frame support member 71. A ball screw 72 passes through a threaded bracket (not shown) on the other side of the plate 68. The ball screw 72 is coupled to a stepping motor 76 by a coupling 77. The plate 68 is stabilized by two guide rods 73 and 74 which pass through slides (not shown).

Figure 6:
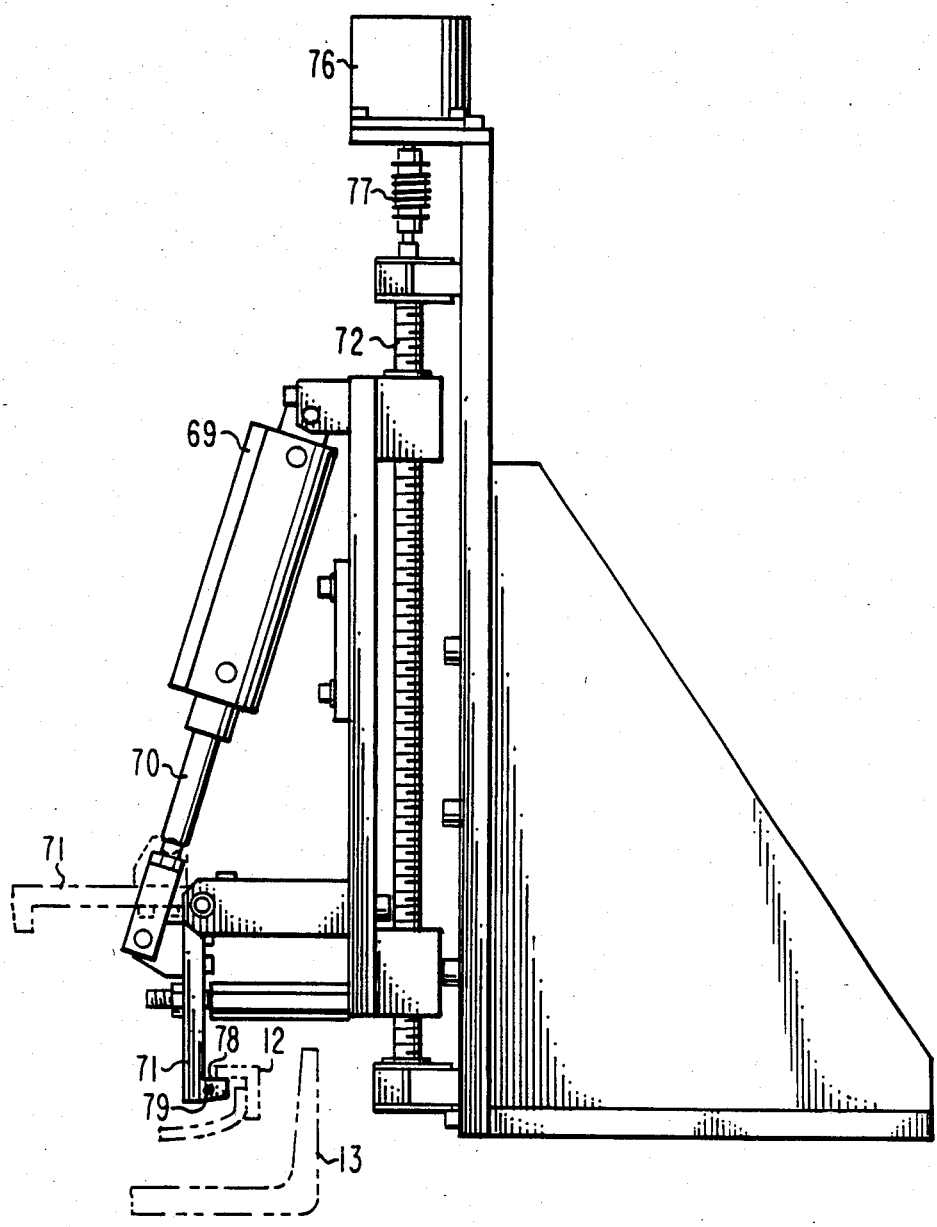
FIG. 6 is a side view of the frame support means taken along line 6—6 of FIG. 4.

In FIG. 6, when the faceplate 13 and frame 12 are initially placed in the vicinity of the welding head 28, the frame support member 71 is in a horizontal position, as shown in phantom lines. The cylinder 69 is actuated to extend the shaft 70 outwardly and rotate the support member 71 into the vertical position. A lip 78 of the support member 71 is then below the surface of the frame 12. A sensor 79 is actuated to sense the bottom surface of the frame 12. The stepping motor 76 is actuated to turn the ball screw 72 and move the frame support member 71 upwardly until the lip 78 contacts the lower surface of the frame 12. The sensor 79, which can be a fluid sensor or an eddy current sensor, de-energizes the motor 76 and the lip 78 supports the frame 12. The frame support 81 is moved into contact with the frame 12 by a stepping motor 80 independently of the motion of the motor 76.

In FIG. 4, after the frame supports 71 and 81 firmly support the frame 12, the cylinder 31 is actuated to lower the welding head 28 until a mechanical stop 82 contacts the upper surface of the frame 12.

Figure 7:
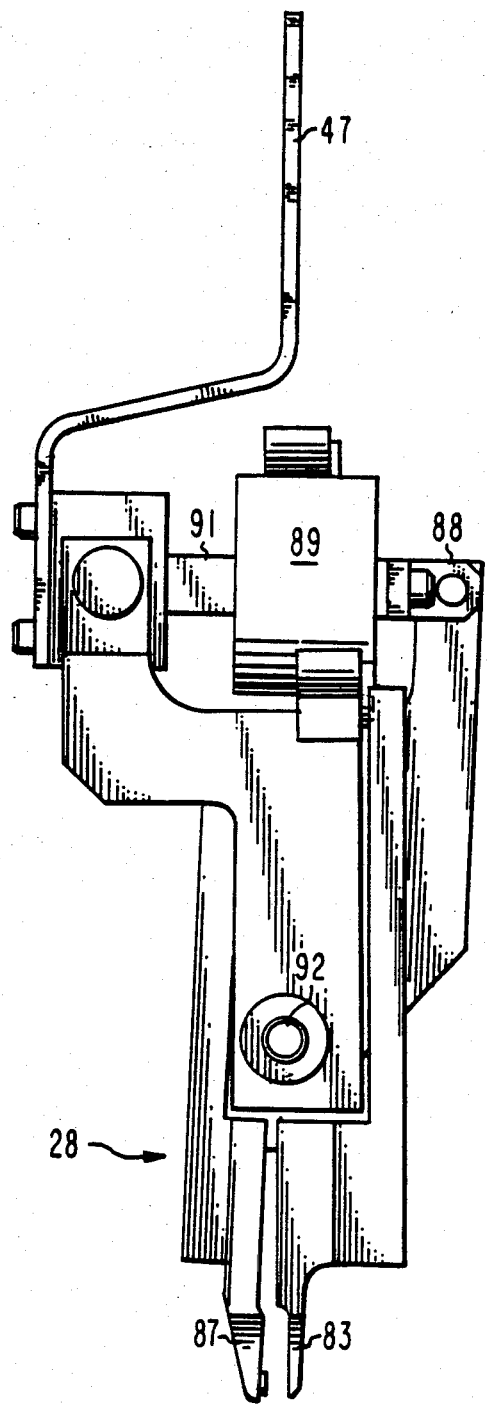
FIG. 7 is a side view of the welding and ground electrodes.
Figure 8:
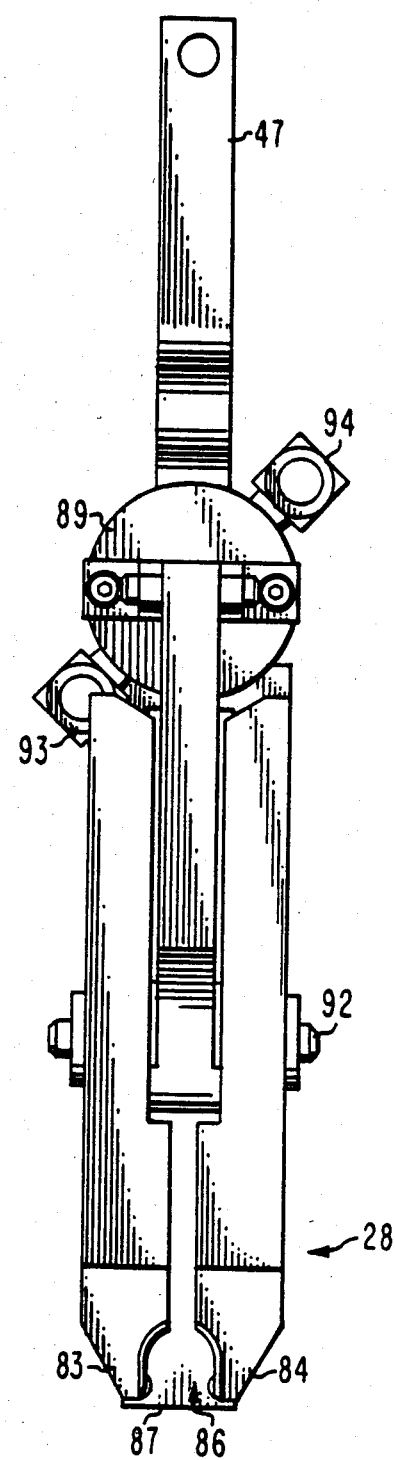
FIG. 8 is a front view of the welding and ground electrodes.

The welding head 28 is shown in detail in FIGS. 7 and 8. The welding head 28 includes two welding electrodes 83 and 84 each of which has a corner removed to form an open ended aperture 86. A single ground electrode 87 is arranged to provide electrical contact with both of the welding electrodes 83 and 84. The welding electrodes 83 and 84 are electrically isolated and are mechanically coupled to a mounting plate 88 of a small flat cylinder 89. The ground electrode 87 is coupled with a shaft 91 of the cylinder 89. The electrodes 83, 84 and 87 are pivoted about a pin 92 to move in a scissor-like manner. Accordingly, when the cylinder 89 is actuated to move the shaft 91 outwardly, the welding electrodes 83 and 84 move away from the ground electrode 87. When the shaft 91 is retracted by the cylinder 89, the welding electrodes 83 and 84 close toward the ground electrode 87.

Figure 1:
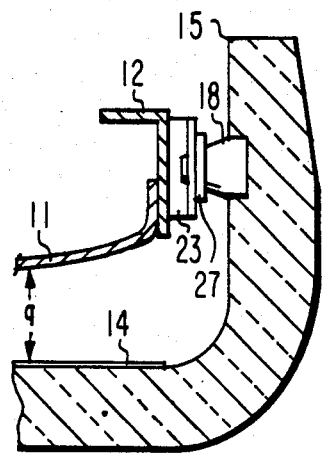
FIG. 1 is a cross section of a portion of a color picture tube showing a shadow mask mounted in a faceplate panel.
Figure 2:
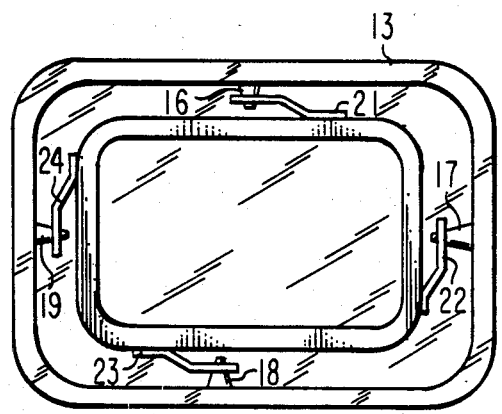
FIG. 2 is a plan view showing a shadow mask supported in a kinescope panel.
Figure 3:
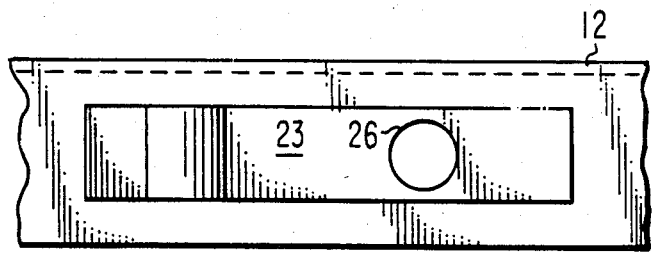
FIG. 3 is an enlarged view of a spring which retains the shadow mask in a faceplate panel.

In FIGS. 1 and 7, when the welding head 28 is lowered to the predetermined position for welding, the welding electrodes 83 and 84 contact the washer 27 on opposite sides of the stud 18. The stud 18 therefore rests in the open aperture 86. The ground electrode 87 rests between the frame 12 and the spring 23. The electrodes 83, 84 and 87 therefore are made sufficiently thin to allow them to enter the narrow spaces between the panel 13 and frame 12. When the cylinder 89 is retracted, the welding electrodes 83 and 84 firmly contact the washer 27 and the ground electrode 87 firmly contacts the spring 23. Because the welding electrodes 83 and 84 are electrically isolated, separate welding circuits can be used to apply individual welds to the washer 23 on opposite sides of the stud 18. In FIG. 8, the cylinder 89 includes connectors 93 and 94 which can be used to electrically or pneumatically actuate the cylinder 89.

In operation, the panel 13 is initially placed upon the rests 62 and 63 of the moveable support 58. The panel is clamped in a centered position by a mechanical mechanism which is within the purview of one skilled in the art. The vibrators 64 (FIG. 5) are used to vibrate the frame 12 to assure that the springs are properly seated on the studs. The carrier 58 is moved inwardly toward the welding head 28 by use of an air cylinder, ball screw and motor or other convenient mechanism. The inward motion of the carrier 58 can be limited by the use of a proximity switch or a mechanical stop. The moveable carrier 58 is raised to a preset height while the frame support members 71 and 81 are in the horizontal position (FIG. 6). The carrier 58 is then retracted to allow the panel 13 to locate against the reference arm 33. The support members 71 and 81 are rotated to the vertical position so that the support surface 78 lies below the frame 12. The frame sensors 79, which can be air sensors or eddy current sensors are actuated and the stepping motors 76 and 80 are actuated to individually raise the frame support members 71 and 81 until they rest against the bottom surface of the frame 12. The welding gun assembly is lowered until the stop 82 engages the top surface of the frame 12. During the lowering of the welding head assembly, the open aperture 86 formed in the weld electrodes 83 and 84 engages the stud. The articulated joint formed by the pins 43, 46 and the spring 44 allows the welding head 28 to pivot and the stud enters the aperture 86 when the stud is not aligned with the center of the welding head. The suspension of the welding head 28 with the flexible straps 52 and 53 gives the welding head freedom to twist out of the plane of FIG. 4 to assure that the electrodes span the washer 27 and the spring 23 when the spring is not aligned with the gap between the ground electrode 87 and the welding electrodes 83 and 84. After the electrodes span the washer 27 and the spring 23, the cylinder 89 (FIG. 7) is energized to firmly clamp the washer and spring between the weld electrodes 83 and 84 and the ground electrode 87. A welding current is passed through the weld electrodes 83 and 84, the washer 27, the spring 23 and the ground electrode 87 to effect the individual spot welds on opposite sides of the stud 18. The cylinder 89 is opened to free the electrodes 83, 84 and 87 and allow the welding head to be raised back to the neutral position. The moveable carrier is retracted, lowered and backed outwardly to the initial position and the panel is removed and the next one inserted for welding.

What is claimed is:

1. A welding apparatus adapted for welding a washer to a frame retaining spring while said washer and said spring are in engagement with a stud affixed to a sidewall of a kinescope panel, said spring having an aperture for loosely receiving said stud and said washer having an aperture for snugly receiving said stud whereby said washer and said spring retain a frame at a predetermined spaced relationship within said panel, said welding apparatus comprising:

moveable carrier means for receiving said panel in a centered position and for moving said panel to a preselected weld location;
frame support means;
means for positioning said frame support means in the vicinity of said frame;
frame sensing means;
means responsive to said frame sensing means for moving said frame support means into contact with said frame whereby said frame support means supports said frame at said predetermined location;
a welding head including at least one welding electrode and at least one ground electrode, said welding electrode including an aperture dimensioned in accordance with the diameter of said stud;
means for moving said welding head to said preselected weld location whereby said washer and said spring are positioned between said welding electrode and said ground electrode; and
means for closing said electrodes against said frame retaining spring and said washer with said aperture engaging said stud, whereby welding current can be passed through said electrodes to weld said washer to said spring.

2. The welding apparatus of claim 1 wherein said welding head is supported by an articulated joint whereby said welding head is free to pivot in the plane of said frame retaining spring.

3. The welding apparatus of claim 2 wherein said welding head is suspended from said articulated joint by at least one flexible strap whereby said welding head is free to flex with respect to the plane of said spring.

4. The welding apparatus of claim 3 wherein said welding electrode includes at least two parts for individually contacting said washer on opposite sides of said aperture.

5. The welding apparatus of claim 4 wherein said welding head includes stop means for positioning said welding head at said preselected weld location.

6. The welding apparatus of claim 5 wherein said frame support means includes a plurality of L-shaped members, for supporting said frame on the lip of the L.

7. The welding apparatus of claim 2 wherein said welding head includes stop means for positioning said welding head at said preselected weld location.

8. The welding apparatus of claim 7 wherein said frame support means includes a plurality of L-shaped members, for supporting said frame on the lip of the L.

9. A welding apparatus adapted for welding a washer to a frame retaining spring while said washer and said spring are in engagement with a stud affixed to a sidewall of a kinescope panel, said spring having an aperture for loosely receiving said stud and said washer having an aperture for snugly receiving said stud whereby said washer and said spring retain a frame at predetermined spaced relationship within said panel, said welding apparatus comprising:

moveable carrier means for receiving said panel in a centered position and for moving said panel in angled directions to a preselected weld location;
frame support means;
means for positioning said frame support means in the vicinity of said frame;
frame sensing means;
means responsive to said frame sensing means for moving said frame support means into contact with said frame whereby said frame support means supports said frame at said predetermined location;
a welding head including at least one welding electrode and at least one ground electrode;
means for moving said welding head to said preselected weld location whereby said washer and said spring are positioned between said welding electrode and said ground electrode; and
means for closing said electrodes against said frame retaining spring and said washer whereby welding current can be passed through said electrodes to weld said washer to said spring.

10. The welding apparatus of claim 1, wherein said angled directions are substantially U-shaped.

11. The welding apparatus of claim 9 wherein said welding head is supported by an articulated joint whereby said welding head is free to pivot in the plane of said frame retaining spring.

12. The welding apparatus of claim 11 wherein said welding head is suspended from said articulated joint by at least one flexible strap whereby said welding head is free to flex with respect to the plane of said spring.

13. The welding apparatus of claim 12 wherein said welding electrode includes an open aperture dimensioned in accordance with the diameter of said stud, whereby said aperture engages said stud to pivot and flex said welding head to align said welding head with said spring.

14. The welding apparatus of claim 13 wherein said welding electrode includes at least two parts for individually contacting said washer on opposite sides of said aperture.

15. The welding apparatus of claim 14 wherein said welding head includes stop means for positioning said welding head at said preselected weld location.

16. The welding apparatus of claim 15 wherein said frame support means includes a plurality of L-shaped members, for supporting said frame on the lip of the L.

17. The welding apparatus of claim 11 wherein said welding head includes stop means for positioning said welding head at said preselected weld location.

18. The welding apparatus of claim 17 wherein said frame support means includes a plurality of L-shaped members, for supporting said frame on the lip of the L.

* * * * *